Oct. 13, 1936.                 A. R. SPEER                    2,057,068
              APPARATUS FOR TREATING AND DISPENSING BEVERAGES
                  Filed Sept. 6, 1933           2 Sheets-Sheet 1

INVENTOR
ARTHUR R. SPEER
BY
ATTORNEY

Oct. 13, 1936.  A. R. SPEER  2,057,068
APPARATUS FOR TREATING AND DISPENSING BEVERAGES
Filed Sept. 6, 1933  2 Sheets-Sheet 2

INVENTOR
ARTHUR R. SPEER.
BY
ATTORNEY

Patented Oct. 13, 1936

2,057,068

UNITED STATES PATENT OFFICE 2,057,068

APPARATUS FOR TREATING AND DISPENSING BEVERAGES

Arthur R. Speer, Bronxville, N. Y.

Application September 6, 1933, Serial No. 688,273

2 Claims. (Cl. 225—16)

My present invention relates to improvements in the packaging of beverages and in the dispensing of same. I have discovered that the treatment of beverages with ozone results first of all in an improvement in their keeping qualities and in some cases, as in beer, a distinct improvement in the flavor. The improvement in flavor of beer I ascribe to the property of ozone of accelerating the aging of alcoholic beverages. This treatment may be carried out with advantage at the factory so that the beverage suffers no deterioration while in the package and also at the time the beverage is dispensed, thus insuring that no deterioration occurs from the time the first portion of the container is withdrawn until the last is consumed.

It is therefore a principal object of my invention to provide for the treatment of beverages with ozone both at the factory during packaging and at places where the beverage is consumed. A more specific object is to provide for the treatment of beer during the packaging into kegs or bottles and also at restaurants, bars or other places where beer is sold on draught. Particularly in the case of beer is there a problem of preventing deterioration of the beverage in the keg during the dispensing period due to the difficulty of complete sterilization of the keg itself, failure of refrigeration during the dispensing period, etc. Even though the beer or other beverage has been fully preserved during its storage in the keg or other container, it will be of advantage in many instances to again subject the beverage to ozone treatment as it is dispensed in order to prevent fresh contamination.

The problem of adequately preserving beer and other beverages is perhaps less acute when the beverage is bottled because of the ease with which bottles may be sterilized, but nevertheless my invention is also of great value to the packaging of beer or other beverages in bottles.

I have illustrated my invention by describing its application to the preservation and dispensing of beer but I wish it to be understood that my invention is also applicable to other beverages.

The invention will be best understood by reference to the following detailed description taken with the annexed drawings, in which—

Figure 1:
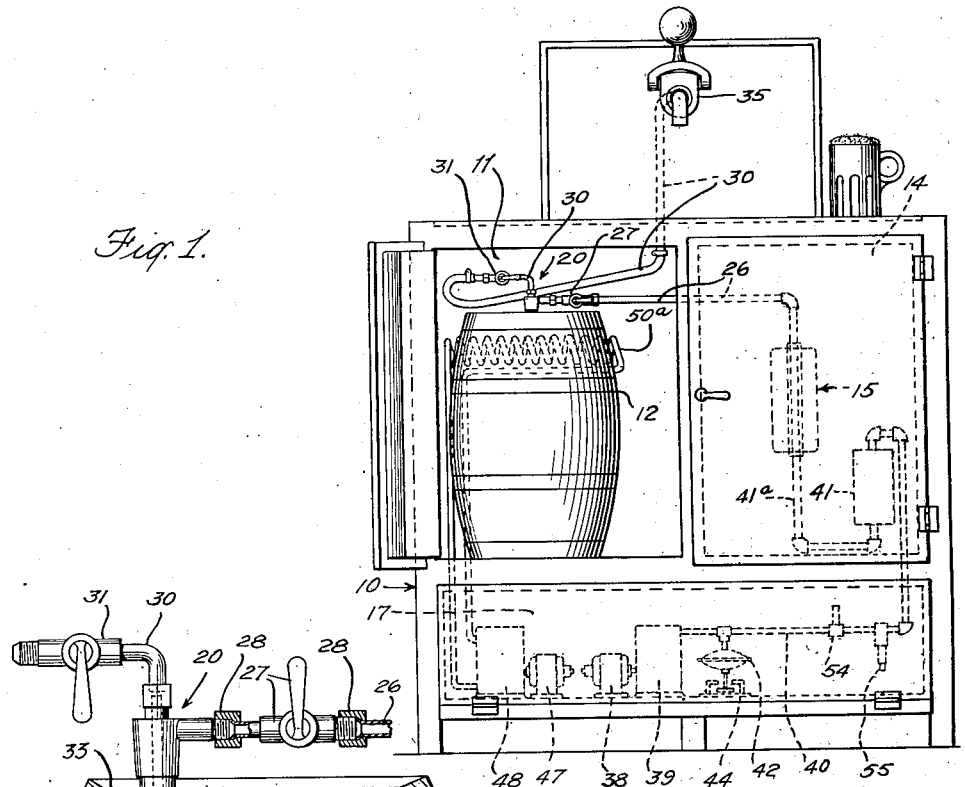
Figure 2:
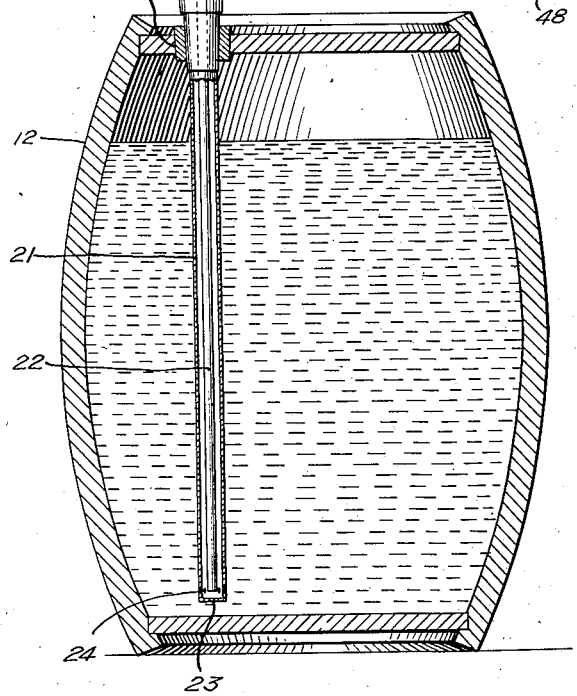
Figure 3:
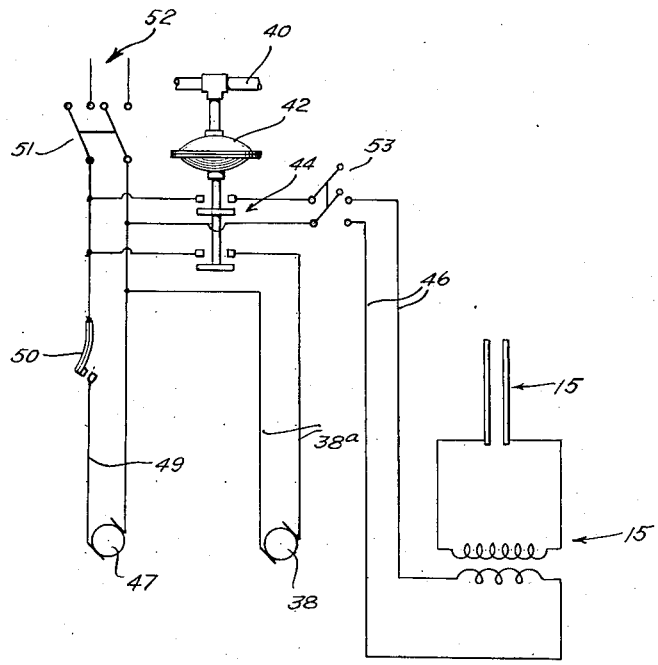
Figure 4:
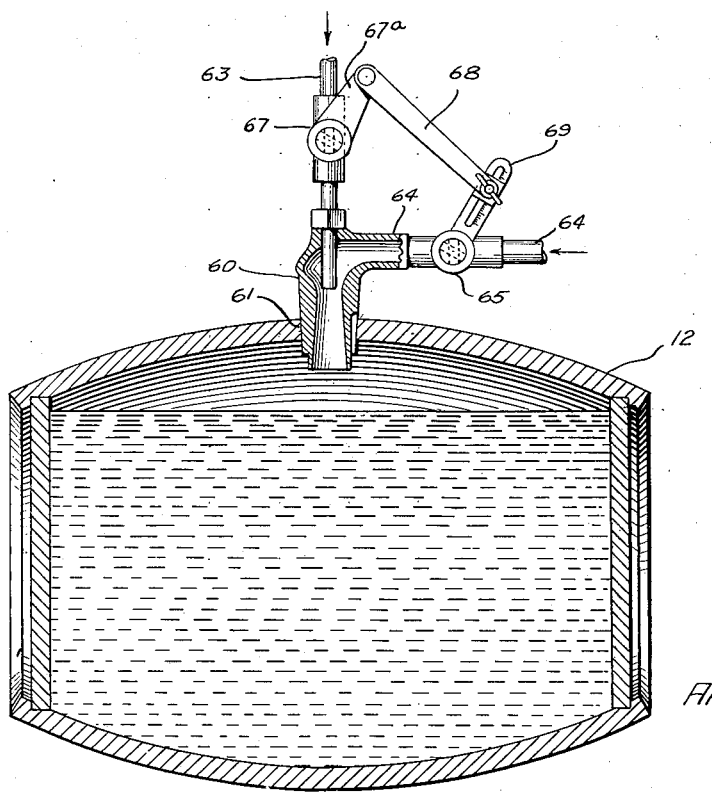

Figure 1 shows a preferred embodiment of my invention for ozonizing and dispensing beer from the keg; Figure 2 is an enlarged view of a portion of Figure 1 showing a keg partially filled with beer and equipped with an improved tapping device; Figure 3 is a wiring diagram of the electrical apparatus employed including the ozonizer; and Figure 4 shows a preferred device for ozonizing beer as it is filled into the keg.

Referring now to Figure 1, a cabinet 10 is provided with a refrigerating space 11 adapted to receive one or more kegs of beer 12, a space 14 to receive the ozonizer 15, and finally a space 17 which may contain apparatus for refrigeration and for operating the ozonizer. The beer is withdrawn from the keg by means of a tapping device 20 which may be similar in construction to devices already on the market but modified so as to contain a sleeve 21 exterior to the draw-off pipe 22, which sleeve may terminate in a closed end 23 having perforations 24. The sleeve thus creates an annular space around the draw-off pipe 22 through which the ozonized air is to be passed to the exit holes 24 through which also the beer passes on its way out of the keg. Ozonized air, from a source to be described, enters through pipe 26, provided with a shut-off cock 27, such pipe 26 connecting with the annular space described around the pipe 22. The cock 27 is preferably secured by means of brass connections 28 which resist the action of ozone. Similarly, the draw-off pipe 30 for the beer is provided with a cock 31. The improved tapping device is inserted in the bung 33 as shown.

The beer pumped from the keg 12 passes through the pipe 30 to the spigot 35. It is a feature of my invention to employ the ozonized air to give a pumping head to the beer. To accomplish this I may employ an ozonizer 15 of known type connected to the tapping device by the pipe 26. To supply air to be ozonized I have provided a motor 38 driving an air pump 39. The air passing from the pump through pipe 40 to the dehydrator 41 as is customary, and thence to the ozonizer 15 through pipe 41a. From the foregoing it will be apparent that upon starting the motor 38, air will be sent through the ozonizer and the ozonized air then led to the tapping device 20 thus causing the beer to be under sufficient pressure to flow through the pipe 30 when the spigot 35 is opened. It is desirable, however, that the pump and ozonizer be shut off after the beer has been treated with ozone and a pumping head once acquired. To this end I have provided for both the air pump and ozonizer being placed in operation whenever the pressure in the pumping system falls to a predetermined value. The means for accomplishing this consists preferably of a pressure control device 42 of known type responsive to pressure in the pipe 40 and hence within the keg 12 with which it connects, which device also actuates a double switch 44 shown best in Figure 3. Thus, when the pressure has fallen to a predetermined value, the control device 42 throws double switch 44 thereby connecting to the line voltage, through the conductors 46, the ozonizer 15 and, through conductors 38a, the motor 38 driving the air pump 39. When the pressure builds up to a desired value the device 42 operates to open the double switch 44 thus cutting off both the ozonizer 15 and the motor 38 driving the air pump 39. A manually operated switch 51 connects the system as a whole with the outside line 52. A switch 53 in the line 46 also enables the ozonizer to be cut out independently of the motor 38. In Figure 3 is shown a motor 47 which drives the refrigerating compressor 48, Figure 1, one of the conductors 49 connecting the motor also having therein the usual thermostatic switch 50. A refrigerating coil 50a comprising a part of the refrigerating system is likewise shown in Figure 1.

It will be seen from the foregoing that the ozonizer is only on when the pressure head has dropped to a predetermined point and that furthermore the apparatus requires no storage of ozone except within the keg 12 wherein it is in contact with the beer. The pressure chosen may be such that when the keg is first connected to the system there will be some flow of ozonized air into the keg to establish this pressure so that the first beer drawn will have been subjected to the action of the ozone. If the switch 53 be turned when the first beer from the keg is withdrawn, that portion of the beer withdrawn will be in physical contact with the inflowing stream of ozonized air as it passes through the openings 24 of the sleeve 21. The pressure regulating device 42 includes means, not shown, for adjusting the pressure at which it will operate and this can be set so as to give any frequency desired, within limits, for the operation of the ozonizer. It is desirable however to admit ozone to the keg before the beer is withdrawn in order to permit ozone to be in contact with the beer for an appreciable time. A blow-off 54 is provided in the line 40 as is also a connection 55 for an auxiliary air supply, not shown.

In Figure 4, I have shown a device for ozonizing beer as it is filled into the keg. The filling device shown comprises an injector 60 fitting within the bung hole of the keg 61. Here the beer flowing through the pipe 63 meets a stream of ozonized air from pipe 64 and a thorough mixing of the two fluids occurs at this point. Conveniently, valve 65 in the ozone line and valve 67 in the beer line are connected for simultaneous operation by link 68, the latter connecting arm 67a of valve 67 with arm 69 of the valve 65. Arm 69 is desirably slotted, as shown, and means are provided as shown for holding the corresponding pivot of link 68 in an adjusted position throughout such slot, thereby permitting the throw of the arm 69 to be varied in respect of the throw of the arm 67a. By this means both valves may be operated simultaneously and the opening of valve 65 varied in respect of the opening of valve 67. It is obvious that the beer filled into bottles can be ozonized in a similar manner.

Various changes may be made in the apparatus shown without departing from the spirit of my invention. For example, in lieu of the ozonizer 15, ozonized air in any desired concentration can be supplied by containers in which the gas is held under pressure. Furthermore, certain of the advantages of my invention will be had even where the ozone is added to the beverage immediately preceding consumption, one such advantage being the prevention of infection from insufficiently cleansed drinking vessels or other apparatus with which the beverage comes into contact.

I claim:

1. In an apparatus for dispensing and treating beer or other beverages, a container for the beer, an ozonizer connected thereto, means for supplying air under pressure to said ozonizer and for supplying the ozonized air to said container and through the contents of same to thereby treat the beer and to provide a pumping head therefor, and means for controlling the supply of air to said ozonizer by the pressure in said container.

2. In an apparatus for treating and dispensing beer and other beverages, a container therefor, an ozonizer connected thereto, means for supplying air under pressure to said ozonizer, means being provided for causing the ozonized air to pass through the beer to constitute a pumping head therefor, and means responsive to the pressure in said container for simultaneously cutting off the air to the ozonizer and for stopping the operation of same.

ARTHUR R. SPEER.